Sept. 20, 1966 H. HURVITZ 3,274,325

MUSIC ENHANCEMENT

Filed May 17, 1963

INVENTOR
HYMAN HURVITZ

BY Hurvitz & Rose

ATTORNEYS

United States Patent Office 3,274,325
Patented Sept. 20, 1966

3,274,325

MUSIC ENHANCEMENT

Hyman Hurvitz, 1313 Juniper St. NW., Washington, D.C.

Filed May 17, 1963, Ser. No. 281,214
11 Claims. (Cl. 84—1.23)

The present invention relates generally to music enhancement, and more particularly to devices for enriching audio spectra representing music.

It is generally known that music may be enhanced by addition of one or more duplicate slightly displaced spectra representing the music. To this end, for example, the piano utilizes two or three strings for each of certain notes, and slightly detunes the strings, each with respect to the other or others.

It is an object of the present invention to enhance a music spectrum by generating two or more additional frequencies, slightly detuned with respect to each frequency in the original spectrum.

It is a further object of the invention to enhance music by frequency or amplitude modulating an audio band representing the music and outphasing the original band with the modulated resultant to eliminate, wholly or in part, the original band from the modulated resultant.

The above and still further objects, features and advantages of the present invention will become apparent upon consideration of the following detailed description of one specific embodiment thereof, especially when taken in conjunction with the accompanying drawings, wherein.

Figure 1:
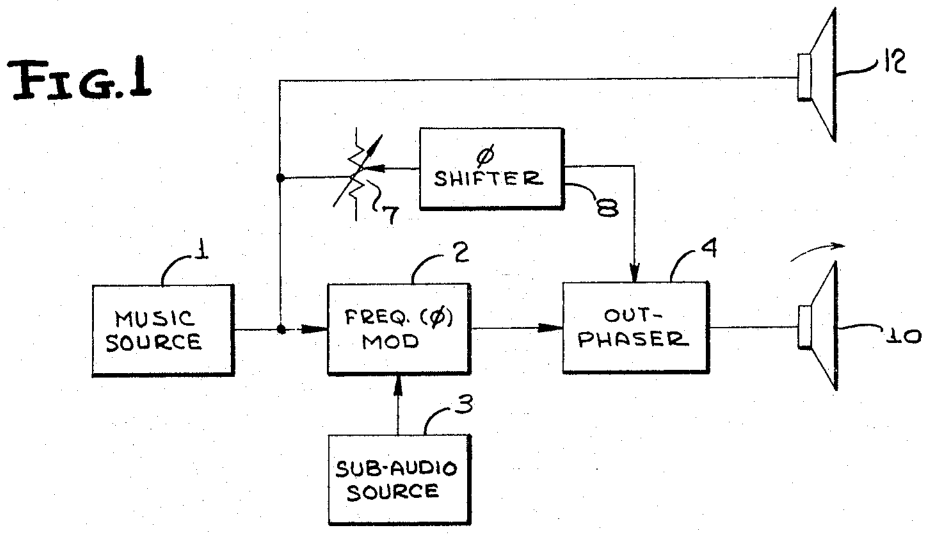
FIGURE 1 is a block diagram of a system according to the invention.

In FIGURE 1 of the drawings, 1 is a source of electronic music, i.e. an electronic organ, a microphone, a phonograph or the like, and accordingly provides a complex spectrum at each instant of time over a period.

The spectrum provided by source 1 is applied to a frequency or phase modulator 2. Modulating signal is supplied by source 3, the spectrum representing the carrier. The source 3 may in a simple case be about three or four c.p.s., and may be sinusoidal or complex. It is known that frequency or phase modulation can generate may side bands. These side bands add to form a modulated wave, so that if the output of modulator 2 were heard it would sound like the original audio band supplied by source 1, with vibrato added.

In accordance with the invention the original band supplied by source 1 is outphased in outphaser 4, with the modulated band supplied by modulator 2. By adjustment of relative amplitudes of the signals supplied to outphaser 4, the original band, representing carrier, can be balanced out, leaving the side-bands. Or, the original band can be partially eliminated, or so adjusted in phase and/or amplitude that the out of phase carrier is greater than the carrier in the modulated signal, or out of phase therewith. Each of these cases presents a different result, audibly considered. Amplitude can be varied by potentiometer 7, and phase shifted by phase shifter 8. The output of outphaser 4 is acoustically radiated by speaker 10.

A frequency or phase shifted audio band with carrier removed no longer sounds like vibrato modulated music. Two or more side bands can be generated for each frequency in the original band, with separations equal to the frequency of the sub-audio source if the latter is single frequency. If the sub-audio provides a complex signal the side bands will have a complex pattern.

Figure 2:
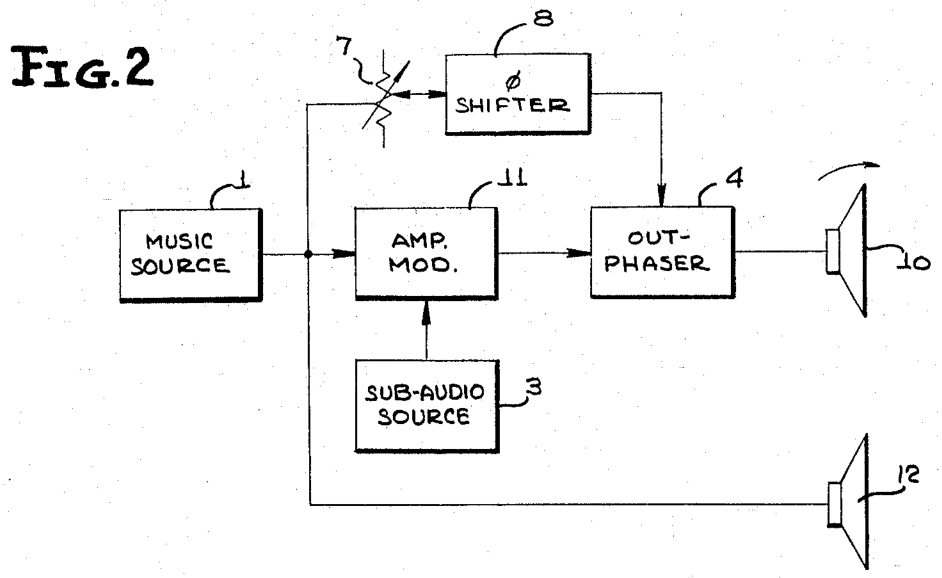
FIGURE 2 is a block diagram of a modification of the system of FIGURE 1.

In FIGURE 2 use is made of an amplitude modulator 11 in place of the frequency modulator of FIGURE 1. A frequency modulator can supply more than two side bands, but an amplitude modulator only two, for each frequency in the modulating signal. However, it may be musically advantageous to limit the number of side bands.

The original carrier can be radiated acoustically in a separate speaker 12, without re-constituting the modulated carrier, because phase relations are destroyed by the spacing between speakers 10, 12.

Either or both of speakers 10, 12 may be rotating radiators, of the Leslie type, now commonly employed in the organ art, which has the effect of randomizing phase relations and introducing vibrato tremolo.

In general, the orginal spectrum, i.e. the carrier, may be radiated at high level, in the system of FIGURE 2, and the sidebands at lower level, say 20%. At any given listening position the phase relationship between carrier and side-bands will be different for each frequency. Summing of carrier and side-bands will thus generate some ampltiude modulation and some phase modulation for each frequency, but the amounts of each will differ for the different frequencies. Rotation of one or both speakers will result in further randomization on a time basis, and such rotation may be at about 1 c.p.s.

Considerations similar to those expressed in the preceding paragraph apply also to the system of FIGURE 1.

While I have described and illustrated on specific embodiment of my invention, it will be clear that variations of the details of construction which are specifically illustrated and described may be resorted to without departing from the true spirit and scope of the invention as defined in the appended claims.

What I claim is:

1. In combination, a source of a wide audio band representing music, modulation means responsive to said wide audio band for generating a modulated band containing at least said wide audio band and two side bands for each frequency of said wide audio band separated by a sub-audio separation, and means for at least partially outphasing said audio wide band from said modulated band.

2. In combination, a source of a wide audio band representing music, modulation means responsive to said wide audio band for generating a modulated band containing at least said wide audio band and two side bands for each frequency of said wide audio band separated by a sub-audio separation, and means for substantially completing outphasing said audio band from said modulated band.

3. In combination, a source of a wide audio band representing music, first means for acoustically radiating said wide audio band, outphaser means responsive to each frequency of said audio band for generating at least two side bands of said each frequency separated by a sub-audio separation, and second means for acoustically radiating said side bands, said first and second means for acoustically radiating being discrete and substantially separated.

4. In a music system, a source of a wideband complex audio spectrum representing music, a modulator in cascade with said source, a subaudio frequency source of modulating signal connected to said modulator for modulating said wide complex audio spectrum to produce a complex carrier and complex sidebands, an outphaser connected in cascade with said modulator, circuit means applying said wideband complex audio spectrum representing music to said outphaser so as to outphase at least in part said complex carrier without outphasing said complex sidebands, and a loudspeaker connected in cascade with said outphaser.

5. The combination according to claim 4 wherein said modulator is a frequency modulator.

6. The combination according to claim 4 wherein said modulator is an amplitude modulator.

7. The combination according to claim 4 wherein is provided a further loudspeaker coupled directly to said source so as to radiate only said wide band complex audio spectrum.

8. The combination according to claim 4 wherein is provided a phase shifter circuit connected between said source and said outphaser as part of said circuit means.

9. In a system for providing chorus effect, a source of a complex band of audio frequencies representing music, means for angle modulating said complex band of audio frequencies to generate at least one pair of complex side bands in addition to a further complex band of audio frequencies having the same frequencies as said first mentioned complex band of audio frequencies but of reduced amplitude, and means for outphasing said first and further complex bands of audio frequencies sufficiently to leave an outphased remainder of substantially zero amplitude and said at least one pair of complex sidebands.

10. In a system for providing chorus effect in response to a source of a complex band of audio frequencies produced by an electronic musical instrument, means for frequency modulating said complex band of audio frequencies sufficiently to produce at least one pair of complex sidebands and a complex carrier, and means for at least largely removing said complex carrier, whereby said at least two sidebands become individually audible.

11. A system for generating chorus effects in response to a complex audio spectrum representing music, comprising means responsive to said audio spectrum for generating a new spectrum including a substantial replica of said audio spectrum as a carrier plus sidebands of said audio spectrum, and means for removing said carrier from said new spectrum.

References Cited by the Examiner

UNITED STATES PATENTS

| | | | |
|---|---|---|---|
| 2,941,435 | 6/1960 | Henley | 84—1.22 |
| 3,004,460 | 10/1961 | Wayne | 84—1.23 |
| 3,007,361 | 11/1961 | Wayne | 84—1.24 |

ARTHUR GAUSS, *Primary Examiner.*

J. BUSCH, *Assistant Examiner.*